US012218616B2

(12) United States Patent
Shoji et al.

(10) Patent No.: US 12,218,616 B2
(45) Date of Patent: Feb. 4, 2025

(54) POWER SUPPLY DEVICE

(71) Applicant: Mitsubishi Electric Corporation, Tokyo (JP)

(72) Inventors: Masaki Shoji, Tokyo (JP); Nobuhiro Kihara, Tokyo (JP); Kado Nakagawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 330 days.

(21) Appl. No.: 17/697,016

(22) Filed: Mar. 17, 2022

(65) Prior Publication Data
US 2022/0368271 A1 Nov. 17, 2022

(30) Foreign Application Priority Data

May 12, 2021 (JP) .................. 2021-080758

(51) Int. Cl.
H02P 29/68 (2016.01)
H02M 1/14 (2006.01)
H02M 1/32 (2007.01)
H02P 27/06 (2006.01)

(52) U.S. Cl.
CPC .............. *H02P 29/68* (2016.02); *H02M 1/14* (2013.01); *H02M 1/327* (2021.05); *H02P 27/06* (2013.01)

(58) Field of Classification Search
CPC ...... H02P 29/68; H02P 27/06; H02P 2201/09; H02M 1/007; H02M 1/0054; H02M 1/327; H02M 3/158; H02M 7/53871; H02M 1/14; H02M 7/5387
See application file for complete search history.

(56) References Cited

U.S. PATENT DOCUMENTS

| 2003/0057914 | A1 | 3/2003 | Kamatsu et al. |
| 2003/0117823 | A1 | 6/2003 | Sato |
| 2004/0228150 | A1 | 11/2004 | Sato |
| 2009/0167234 | A1* | 7/2009 | Uechi ............... H02M 1/32 |
| | | | 180/65.285 |

(Continued)

FOREIGN PATENT DOCUMENTS

| CN | 206313695 U | * | 7/2017 |
| JP | 2003189599 A | | 7/2003 |

(Continued)

OTHER PUBLICATIONS

Office Action dated Apr. 5, 2022 issued by the Japanese Patent Office in JP App No. 2021-080758.

*Primary Examiner* — Bickey Dhakal

(74) *Attorney, Agent, or Firm* — Sughrue Mion, PLLC

(57) ABSTRACT

An object is to achieve overheat protection for a converter and stable voltage output thereof. This power supply device includes: a converter connected to power supply voltage and having a plurality of switching elements; a temperature detection circuit for detecting a temperature of the converter; an inverter which is connected between the converter and a load, and which converts output voltage of the converter and outputs resultant voltage to the load; and a control unit for controlling the switching elements of the converter. When the temperature detected by the temperature detection circuit has exceeded a first limitation value, the control unit controls the switching elements so that the output voltage of the converter becomes the power supply voltage at a set change rate.

13 Claims, 15 Drawing Sheets

(56) References Cited

U.S. PATENT DOCUMENTS

2020/0052642 A1* 2/2020 Kuroki .................... H02P 29/60

FOREIGN PATENT DOCUMENTS

| JP | 3732828 | B2 |   | 1/2006 |
|----|---------|----|---|--------|
| JP | 2009219200 | A | * | 9/2009 |
| JP | 2010200527 | A | * | 9/2010 |
| JP | 4957538 | B2 |   | 6/2012 |

* cited by examiner

FIG. 2A
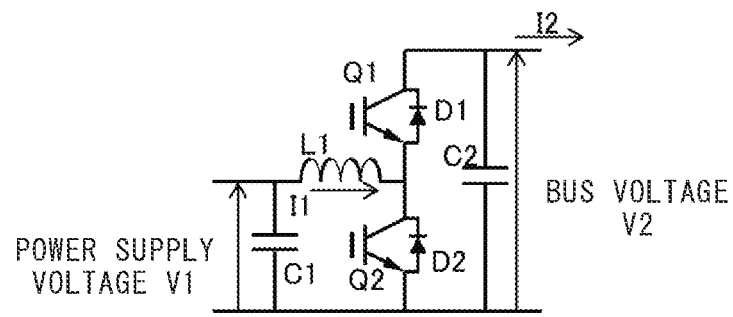
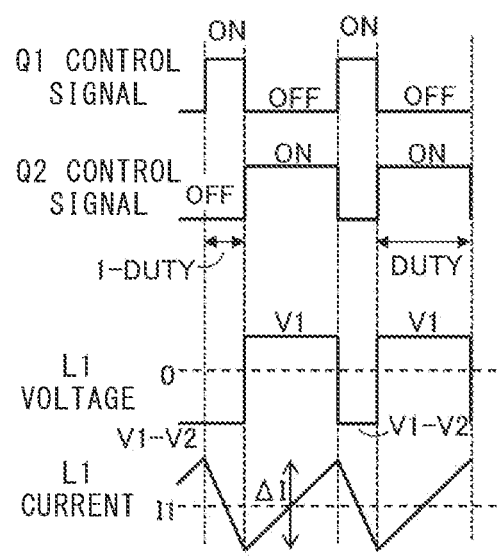
FIG. 2B
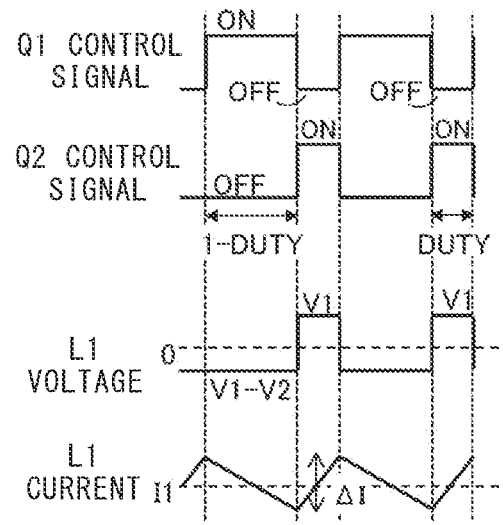
FIG. 2C

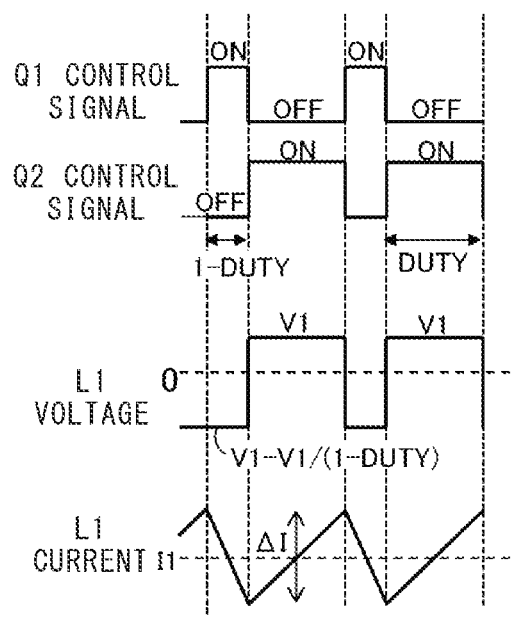
FIG. 16A
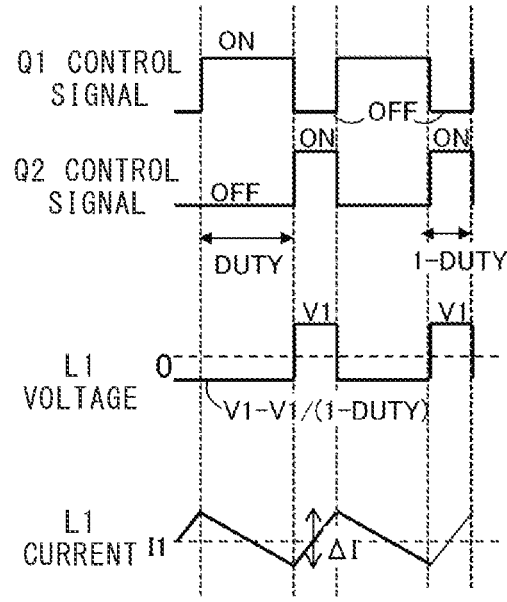
FIG. 16B
FIG. 17
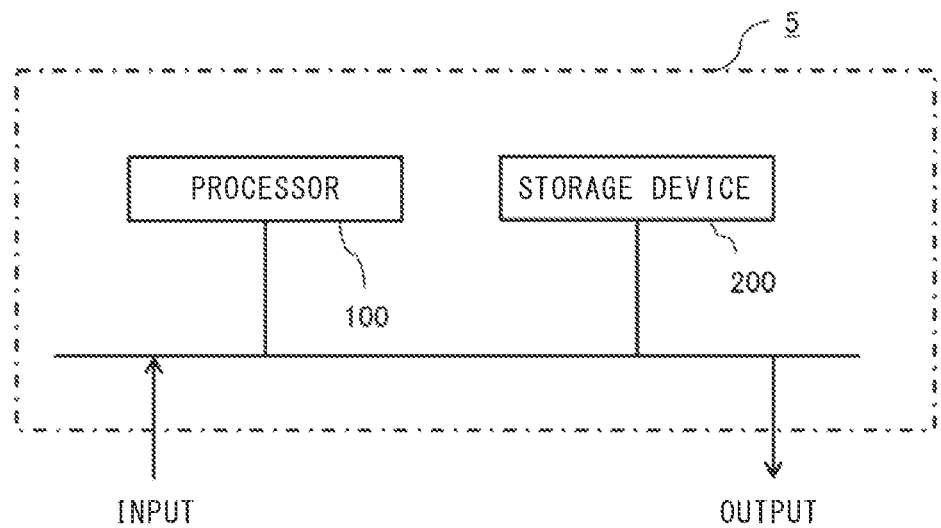

POWER SUPPLY DEVICE

BACKGROUND OF THE INVENTION

1. Field of the Invention

The present disclosure relates to a power supply device.

2. Description of the Background Art

A power supply device connected to a load such as an electric motor includes, as a typical configuration, a converter for boosting voltage from power supply voltage to predetermined bus voltage, and an inverter for supplying power to the load. During operation of the converter, if components composing the converter are overheated, operation fault of the converter might occur, so that the power supply device might be disabled. Therefore, for protection from overheating of components composing the converter, a measure of providing an upper limit value for the bus voltage is known (see, for example, Patent Document 1).

In Patent Document 1, the temperatures of a reactor and a transistor of a converter composing a motive power output device are measured, an upper limit value for bus voltage is set on the basis of the measured temperatures, and for example, the switching frequency of the converter is adjusted so that the upper limit value is not exceeded.

Patent Document 1: Japanese Patent No. 3732828 (second embodiment, FIG. 14 to FIG. 16)

In Patent Document 1, switching operation is performed at the frequency set in accordance with the temperatures of components composing the converter, whereby the components are protected from being overheated. However, in a case where switching is performed at the adjusted frequency while the bus voltage is detected by a voltage sensor so that the upper limit value of the bus voltage is not exceeded, if abnormality occurs in the voltage sensor, for example, the withstand voltage of a main circuit might be exceeded or allowable current might be exceeded, so that there is a possibility that the function of the motive power output device cannot be maintained.

Therefore, a method for overheat protection for components composing the converter without depending on the voltage sensor is required.

SUMMARY OF THE INVENTION

The present disclosure has been made to solve the above problem, and an object of the present disclosure is to provide a power supply device that enables overheat protection for a converter without depending on a voltage sensor.

A power supply device according to the present disclosure includes: a converter connected to a power supply and having a plurality of switching elements; a temperature detection circuit for detecting a temperature of the converter; an inverter which is connected between the converter and a load, and which converts output voltage of the converter and outputs resultant voltage to the load; and a control unit for controlling the switching elements so that the output voltage of the converter becomes predetermined target output voltage. When the temperature detected by the temperature detection circuit has exceeded a first limitation value, the control unit controls the switching elements so that the output voltage of the converter becomes voltage of the power supply from the target output voltage at a predetermined change rate.

The power supply device according to the present disclosure enables overheat protection for a converter without depending on a voltage sensor, whereby operation fault due to overheat of a converter circuit can be avoided.

BRIEF DESCRIPTION OF THE DRAWINGS

FIG. 2A is a diagram showing a circuit example of a converter according to the first embodiment;

FIG. 2B shows current and voltage waveforms at each part in the converter according to the first embodiment;

FIG. 2C shows current and voltage waveforms at each part in the converter according to the first embodiment;

FIG. 16A shows current and voltage waveforms at each part in the converter according to the sixth embodiment;

FIG. 16B shows current and voltage waveforms at each part in the converter according to the sixth embodiment; and FIG. 17 is a hardware configuration diagram of a control unit in the power supply device according to the first to sixth embodiments.

DETAILED DESCRIPTION OF THE PREFERRED

Embodiments of the Invention

Figure 1:
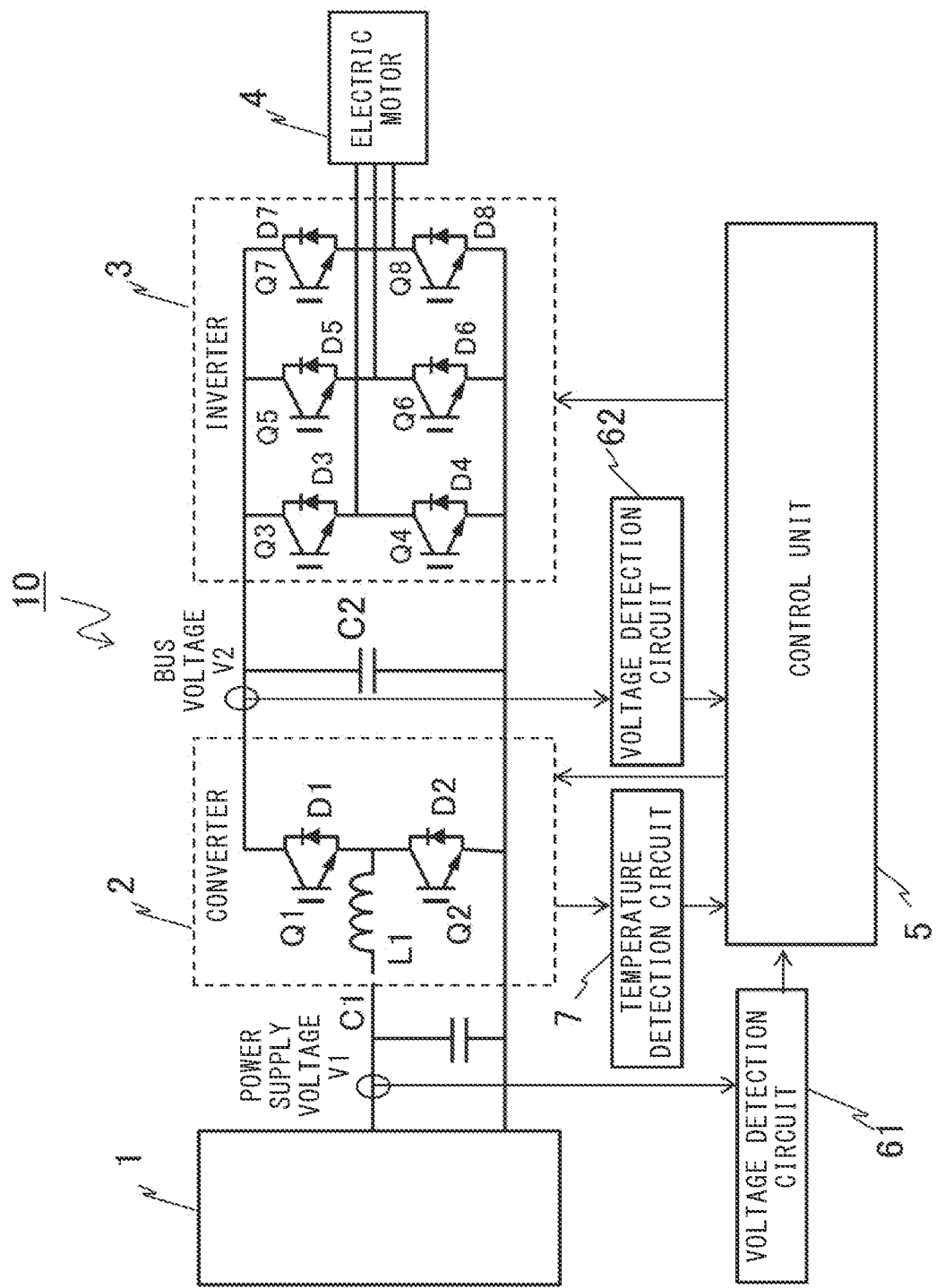
FIG. 1 is a circuit block diagram showing the configuration of a power supply device according to the first embodiment of the present disclosure.

Hereinafter, embodiments of a power supply device according to the present disclosure will be described with reference to the drawings. In the drawings, the same reference characters denote the same or corresponding parts.

First Embodiment

Hereinafter, a power supply device according to the first embodiment of the present disclosure will be described with reference to the drawings.

FIG. 1 is a circuit block diagram showing the configuration of the power supply device according to the first embodiment. In FIG. 1, in a power supply device 10, a converter 2 and an inverter 3 are connected and provided between a power supply 1 and an electric motor 4 which is a load, and an input capacitor C1 and an output capacitor C2 are connected to both ends of the converter 2. A voltage detection circuit 61 for detecting power supply voltage V1 is provided between the power supply 1 and the converter 2, and a voltage detection circuit 62 for detecting bus voltage V2 which is output voltage of the converter 2 is provided between the converter 2 and the inverter 3. Each detection circuit converts the detected voltage to constant voltage and outputs the converted voltage as a voltage detection signal to a control unit 5. A temperature detection circuit 7 is connected to the converter 2, and detects a temperature of a reactor L1 or switching elements Q1, Q2 which are temperature protection target components of the converter 2, by a thermistor or the like, and outputs the temperature as a temperature detection signal to the control unit 5.

The converter 2 includes, for example, the switching elements Q1, Q2 to which rectification elements D1, D2 are respectively connected in parallel, and the reactor L1, and boosts the power supply voltage V1 and controls the bus voltage V2, through control of ON/OFF operations of the switching elements Q1, Q2 by the control unit 5.

The inverter 3 has a three-phase inverter configuration including switching elements Q3 to Q8 to which rectification elements D3 to D8 are respectively connected in parallel, and drives the electric motor 4 through control of ON/OFF operations of the switching elements Q3 to Q8 by the control unit 5.

While the inverter 3 is a three-phase inverter as an example, the inverter 3 is not limited thereto and may have another configuration such as a single-phase inverter.

Although not shown, in order to eliminate noise due to ON/OFF operations of the switching elements of the converter 2 and the inverter 3, and the like, a filter circuit may be provided between the control unit 5, and the temperature detection circuit 7 and the voltage detection circuits 61, 62.

Next, operation of the converter 2 will be described.

FIGS. 2A to 2C show a circuit example of the converter 2, and current and voltage waveforms at each part therein. FIG. 2A is a circuit example of the converter 2. In FIG. 2A, the input capacitor C1 of the converter 2 is connected in parallel to the power supply voltage V1. One end of the input capacitor C1 is connected to one end of the reactor L1. Parallel connection of the switching element Q1 and the rectification element D1, and parallel connection of the switching element Q2 and the rectification element D2, are connected in series, and the connection point therebetween is connected to another end of the reactor L1. The output capacitor C2 of the converter 2 is connected in parallel to series connection of the switching element Q1 and the switching element Q2. The converter 2 controls the voltage of the output capacitor C2, i.e., the bus voltage V2.

FIGS. 2B and 2C show the relationship between a Q1 control signal and a Q2 control signal which are control signals from the control unit 5 for controlling ON/OFF operations of the switching elements Q1, Q2, and voltage and current applied to the reactor L1. As shown in FIGS. 2B and 2C, the switching element Q1 and the switching element Q2 are alternately turned on and off. FIG. 2B shows a case of increasing the bus voltage V2, and FIG. 2C shows a case of making the bus voltage V2 smaller than in the case of FIG. 2B. In actuality, in order to prevent the switching element Q1 and the switching element Q2 from being turned on at the same time, delays are provided to a period in which the switching element Q1 is switched from ON to OFF and the switching element Q2 is switched from OFF to ON, and a period in which the switching element Q2 is switched from ON to OFF and the switching element Q1 is switched from OFF to ON. Here, such delay periods are omitted for simplification of description.

The switching elements Q1 to Q6 are self-turn-off semiconductor switching elements such as insulated gate bipolar transistors (IGBT) or metal oxide semiconductor field effective transistors (MOSFET) which are semiconductor elements, for example. The rectification elements D1 to D8 are diodes such as free-wheeling diodes, for example. In a case of using MOSFETs, parasitic diodes may be used instead of connecting free-wheeling diodes.

In a period in which the switching element Q2 is ON and the switching element Q1 is OFF, voltage of V1 is applied to the reactor L1, and the current changes with a slope of V1/inductance value (the slope is positive). Where the current in this period is denoted by $\Delta I$, $\Delta I$ is represented as follows:

$$\Delta I = (V1/\text{inductance value}) \times (\text{ON period of switching element } Q2).$$

In a period in which the switching element Q1 is ON and the switching element Q2 is OFF, voltage of V1–V2 is applied to the reactor L1, and the current changes with a slope of (V1–V2)/inductance value (the slope is negative).

As shown in FIG. 2A, I1 denotes a DC component of current flowing through the reactor L1.

It is noted that the voltage actually applied to the reactor L1 is a value obtained by subtracting voltage drops at the switching elements Q1, Q2, the rectification elements D1, D2, and members connecting these in the converter 2, but such voltage drops are omitted here.

In the case of increasing the bus voltage V2, the ON period of the switching element Q2 is elongated as shown in FIG. 2B, and in the case of reducing the bus voltage V2, the ON period of the switching element Q2 is shortened as shown in FIG. 2C.

That is, where the ratio of the ON period of the switching element Q2 is DUTY and the ratio of the OFF period thereof is 1–DUTY, the DUTY is increased in the case of increasing the bus voltage V2, and the DUTY is reduced in the case of reducing the bus voltage V2.

Figure 3A:
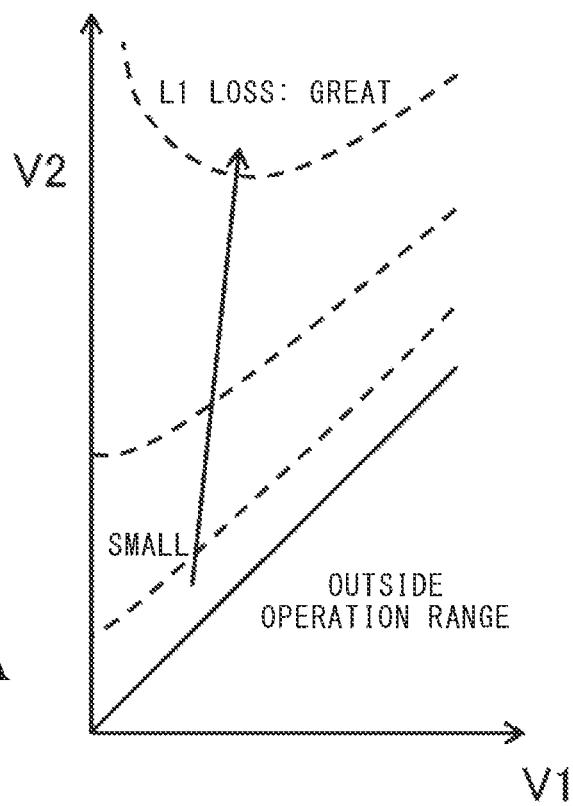
FIG. 3A shows contour lines of reactor loss with respect to voltages of the converter according to the first embodiment.
Figure 3B:
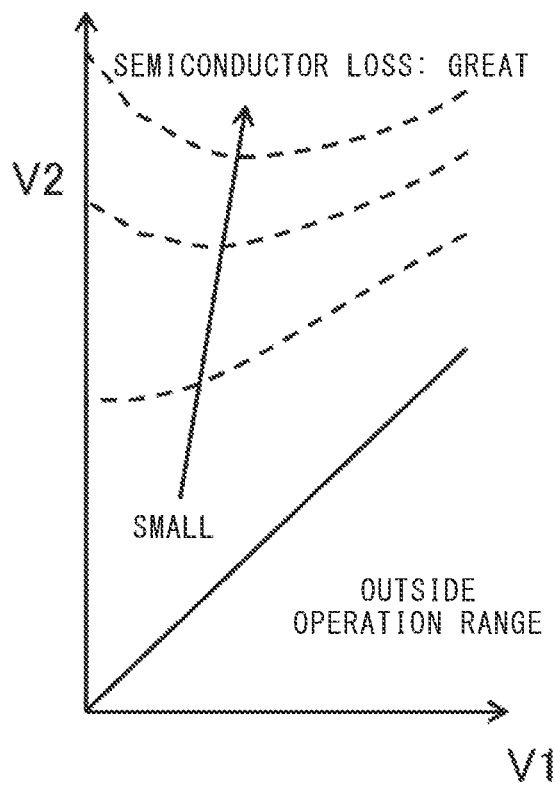
FIG. 3B shows contour lines of semiconductor loss with respect to voltages of the converter according to the first embodiment.

Next, in the converter 2 shown in FIG. 2A, the relationship between loss, and the power supply voltage V1 and the bus voltage V2, will be described with reference to FIGS. 3A and 3B. FIG. 3A shows contour lines of reactor loss with respect to voltage values of the power supply voltage V1 and the bus voltage V2, and FIG. 3B shows contour lines of semiconductor loss with respect to voltage values of the power supply voltage V1 and the bus voltage V2. Here, the semiconductor loss refers to loss in the element that exhibits the greatest loss among losses in the switching elements and the rectification elements composing the converter 2.

As shown in FIG. 3A, the reactor loss becomes greater, as the power supply voltage V1 increases and as V2/V1 which is the boost ratio increases.

As shown in FIG. 3B, the semiconductor loss becomes greater, as the bus voltage V2 increases and as V2/V1 which is the boost ratio increases. It is noted that a region of V1>V2 at the lower right in each graph is outside the operation range of the converter 2.

Figure 4:
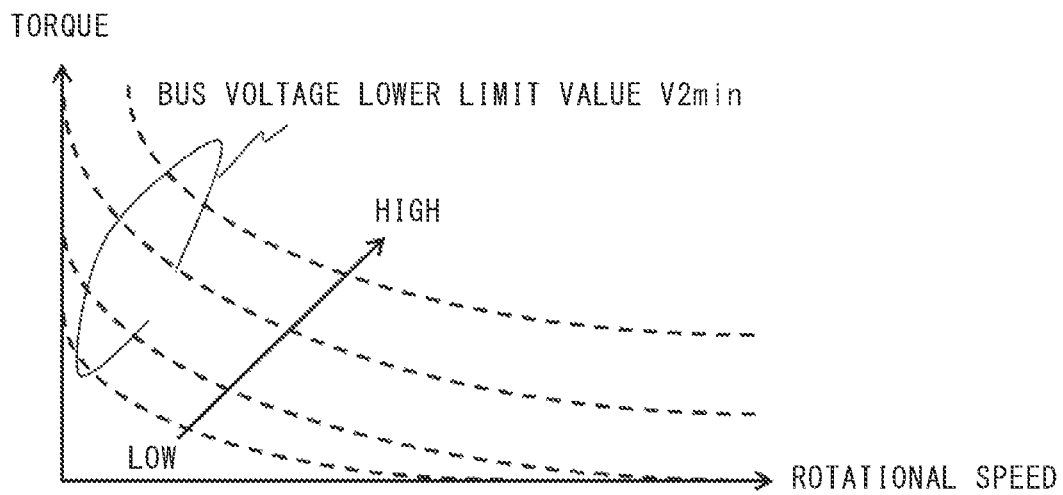
FIG. 4 shows the relationship between bus voltage, and torque and a rotational speed of an electric motor.

Next, the relationship between the bus voltage V2, and torque and a rotational speed of the electric motor 4 which is a load, will be described. FIG. 4 is a contour line graph showing the relationship between the bus voltage V2, and torque and a rotational speed of the electric motor. It is shown that, for the bus voltage V2, required voltage can be calculated in accordance with the torque and the rotational speed of the electric motor. Specifically, as the torque increases and as the rotational speed increases, the bus voltage V2 needs to be increased, and target bus voltage V2 is set to be not less than a lower limit value (V2min) of voltage determined by the torque and the rotational speed. Therefore, as shown in FIG. 4, as the torque increases and as the rotational speed increases, the lower limit value of the bus voltage also becomes higher.

Figure 5:
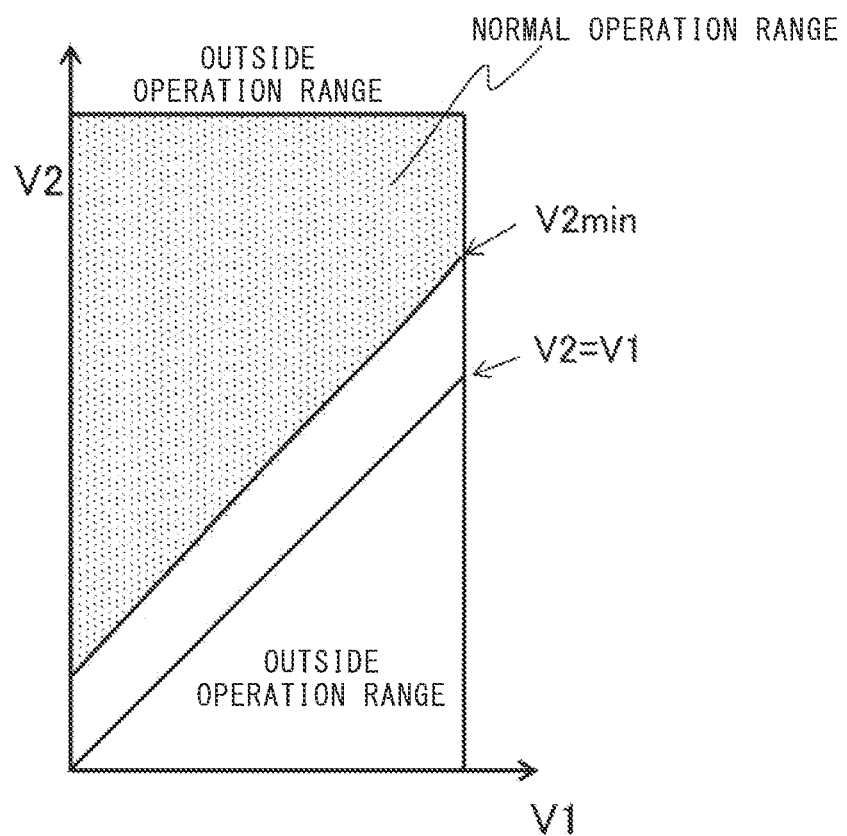
FIG. 5 shows the operable range of the converter according to the first embodiment.

From the above, the operation range of the converter 2 is as shown in FIG. 5. Thus, a region that is on the upper side from a line of V2=V1 in the graph (side where V2>V1) since the converter 2 performs boost operation, and where the voltage determined by the torque and the rotational speed of the electric motor 4 described in FIG. 4 is the lower limit value (V2min) (V2>V2min), is the operation range that can be set.

Here, in a case where the temperature of the component of the converter 2 detected by the temperature detection circuit 7 is lower than a predetermined temperature, for example, target bus voltage V2target is set so that losses in the converter 2, the inverter 3, and the electric motor 4 are reduced. Then, using voltage detection values of the power supply voltage V1 and the bus voltage V2 detected by the voltage detection circuits 61, 62, the control unit 5 performs control so as to reach the set target bus voltage V2target through feedback control.

In a case where the temperature of the component of the converter 2 detected by the temperature detection circuit 7 is higher than the predetermined temperature, ON/OFF operations of the switching elements Q1, Q2 of the converter 2 are controlled by the control unit 5 so that the bus voltage V2 is reduced from the target bus voltage V2target.

Figure 6:
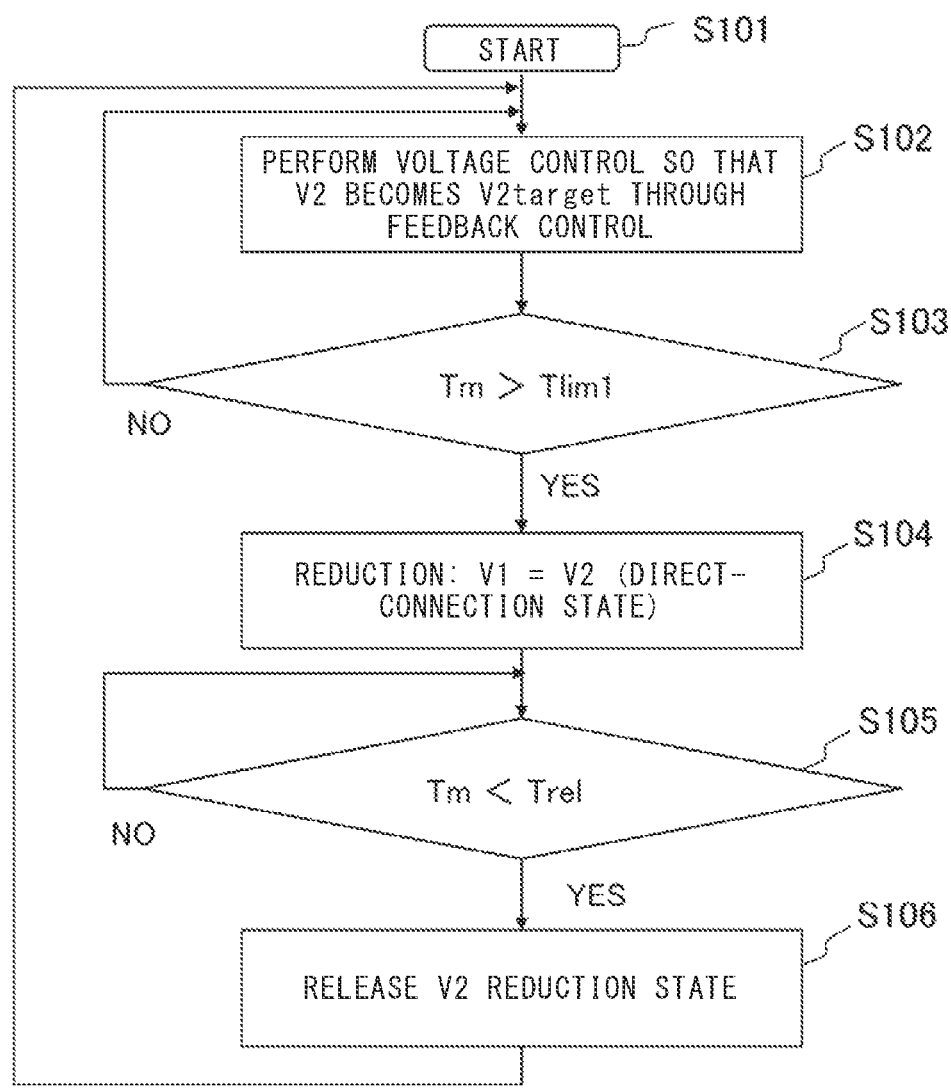
FIG. 6 is a flowchart showing a control procedure for the converter according to the first embodiment.

Next, a temperature Tm of the component of the converter 2 detected by the temperature detection circuit 7 and operation of the converter 2 will be described in detail. FIG. 6 is a flowchart showing an operation procedure for controlling the converter 2 in accordance with the temperature Tm of the component of the converter 2, and FIG. 7 is a time chart showing transitions of the temperature Tm of the component of the converter 2 and the bus voltage V2.

First, operation of the power supply device 10 is started (step S101). In step S102, the converter 2 is controlled by the control unit 5 so that the bus voltage V2 which is the output voltage thereof becomes the target bus voltage V2target at which losses in the converter 2, the inverter 3, and the electric motor 4 are small and which is not less than the lower limit value (V2min) of voltage determined by the torque and the rotational speed of the electric motor 4. At this time, on the basis of V1 detected by the voltage detection circuit 61 and V2 detected by the voltage detection circuit 62, the control unit 5 controls ON/OFF operations of the switching elements Q1, Q2 through feedback control, to perform voltage control for the bus voltage V2. A steady state when the converter 2 is operating at the target bus voltage V2target corresponds to a state at time t0 before time t1 in FIG. 7.

Figure 7:
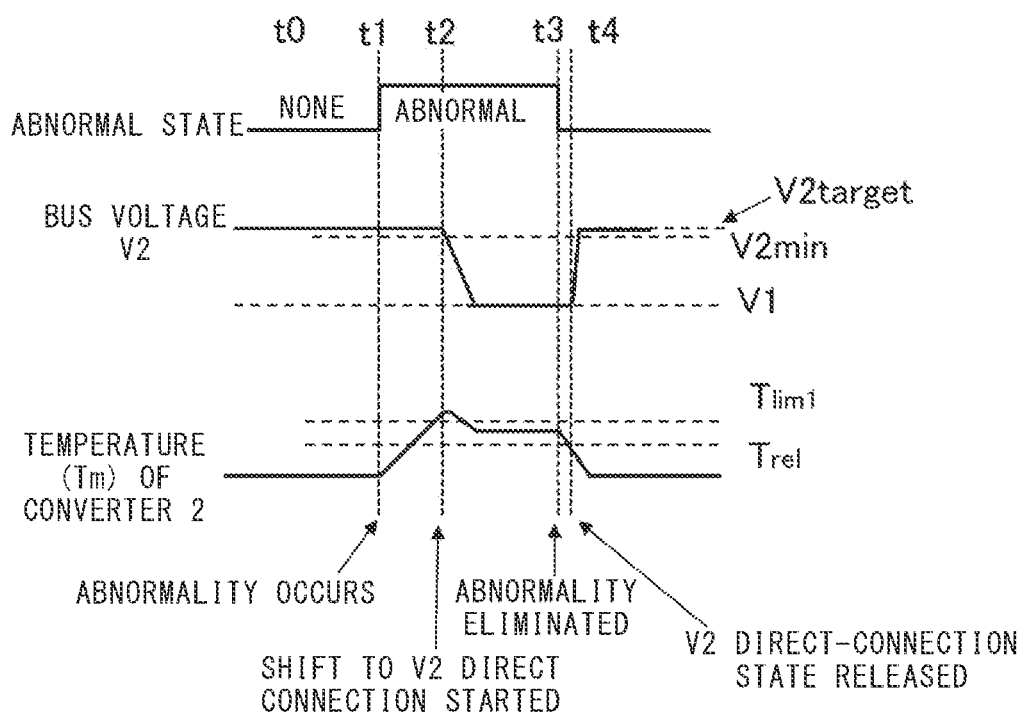
FIG. 7 shows changes in the temperature of the converter and bus voltage according to the first embodiment.

In FIG. 7, at time t1, if abnormality such as increase in a water temperature of a cooler for cooling the converter 2 occurs, the temperature Tm of the component composing the converter 2 detected by the temperature detection circuit 7 starts to increase. At time t2, if the temperature Tm exceeds a temperature $T_{lim1}$ which is a predetermined first limitation value (step S103), the control unit 5 performs control so that the bus voltage V2 is reduced to be lowered from the target bus voltage V2target to the power supply voltage V1 (step S104). Specifically, feedback control is stopped, and control is switched to reduce the DUTY for the switching element Q2 in ON/OFF operations of the switching elements Q1, Q2. Here, the state in which the bus voltage V2 becomes the power supply voltage V1 corresponds to a state in which the inverter 3 is directly connected to the power supply 1.

When a certain period has elapsed from time t2, the bus voltage V2 becomes equal to the power supply voltage V1, and also the temperature Tm of the component composing the converter 2 is reduced. Until the temperature Tm of the component composing the converter 2 becomes lower than a temperature $T_{rel}$ which is a predetermined first release value, the control for making the bus voltage V2 directly connected to the power supply voltage V1 is continued. If abnormality is eliminated at time t3 and then the temperature Tm of the component composing the converter 2 becomes lower than the temperature $T_{rel}$ which is the first release value set to be smaller than the temperature $T_{lim1}$ which is the first limitation value at time t4 (YES in step 3105), the state in which the bus voltage V2 is directly connected to the power supply voltage V1 is released, i.e., the state of reducing the bus voltage V2 is released (step S106), and control is performed so that the bus voltage V2 becomes the target bus voltage V2target again.

In step S104, shifting to the direct-connection state in which the bus voltage V2 becomes the power supply voltage V1 corresponds to reducing the DUTY for the switching element Q2 shown in FIG. 2C. Therefore, the detected voltages from the voltage detection circuit 61 and the voltage detection circuit 62 as used in the feedback control are not needed. Thus, when the temperature Tm of the component composing the converter 2 increases, it is possible to shift to the direct-connection state of reducing the bus voltage V2, even if the power supply voltage V1 and the bus voltage V2 cannot be respectively detected by the voltage detection circuit 61 and the voltage detection circuit 62.

Figure 8:
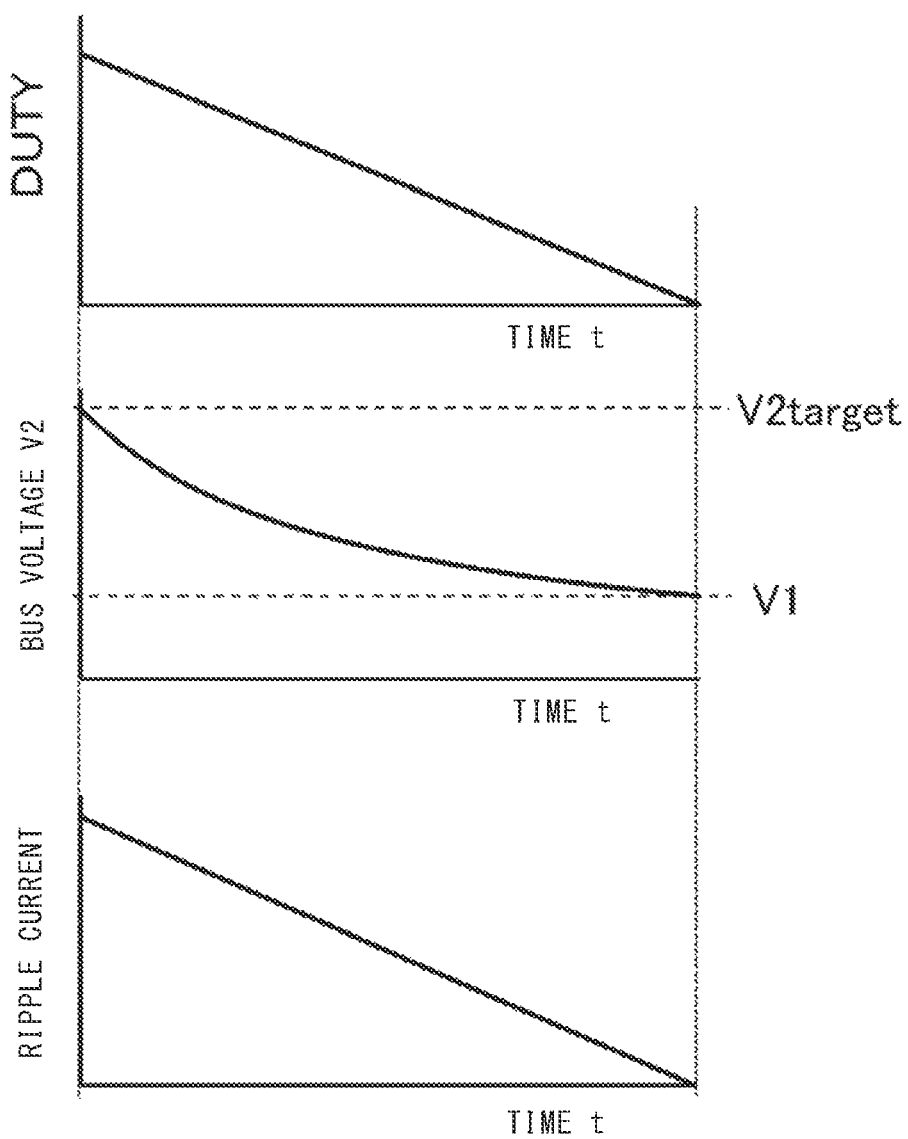
FIG. 8 shows changes in bus voltage and current ripple with respect to transition of DUTY for a switching element Q2 of the converter according to the first embodiment.

Next, an example of transition of the ratio (DUTY) of the ON period of the switching element Q2, change in the bus voltage V2, and change in current ripple of the converter 2 when shifting to the direct-connection state in which the bus voltage V2 becomes the power supply voltage V1 in step S104, will be described. FIG. 8 shows change in the bus voltage V2 and change in current ripple with respect to transition of the ratio (DUTY) of the ON period of the switching element Q2 of the converter 2, and FIG. 9 shows a case where transition of the ratio (DUTY) of the ON period of the switching element Q2 of the converter 2 is different from that in FIG. 8.

As shown in FIG. 8, if the DUTY for the switching element Q2 in the converter 2 is gradually changed with a constant change amount per time without using the voltage detection values detected by the voltage detection circuits 61, 62, the bus voltage V2 immediately starts to decrease, and then gradually mildly reaches the power supply voltage V1, thus shifting to a state in which the inverter 3 is directly connected to the power supply 1. At this time, ripple current of the converter 2 is also reduced with elapse of time, whereby loss in the components composing the converter 2 can be reduced.

Since voltage detection values are not used in shifting to the direct-connection state, even if abnormality in the sensor for detecting the temperature, abnormality in the voltage detection circuits 61, 62, or transitional variation in the power supply voltage V1 occurs, it is possible to maintain control stability without being influenced by such an event.

Figure 9:
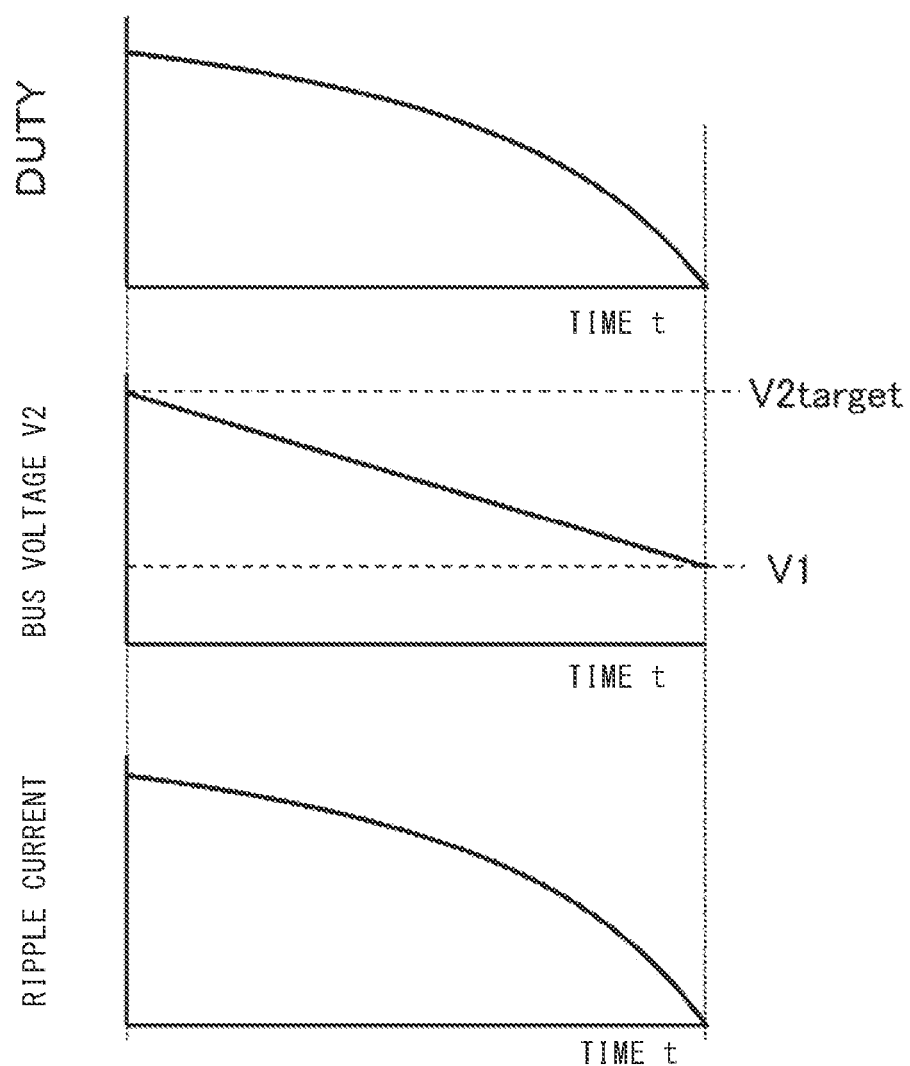
FIG. 9 shows changes in bus voltage and current ripple with respect to another transition pattern of the DUTY for the switching element Q2 of the converter according to the first embodiment.

Similarly, without using the voltage detection values detected by the voltage detection circuits 61, 62, as shown in FIG. 9, if the DUTY for the switching element Q2 in the converter 2 is gradually changed in a predetermined pattern so that the bus voltage V2 becomes the power supply voltage V1 at a constant change rate, ripple current of the converter 2 starts to decrease mildly. The DUTY change pattern for the switching element Q2 may be set and stored in advance. In FIG. 9, the change rate of the bus voltage V2 is not as sharp as that in the case in FIG. 8. In this way, by setting the change rate of the bus voltage V2 to be slower than response on the inverter 3 side and to be faster than the thermal time constant of the component composing the converter 2, it is possible to reduce loss in the components composing the converter 2 while reducing operational shock to the inverter 3 due to voltage variation. Thus, it is possible to contribute to suppression of temperature increase or promotion of temperature reduction in the converter 2 after the control is switched.

As used herein, response on the inverter 3 side typically refers to torque control response, but may be response of current control such as response of power control.

As described above, according to the first embodiment, when the temperature Tm of the component composing the converter 2 increases, the converter 2 is controlled so that the bus voltage V2 becomes the power supply voltage V1, without using the detection voltage values from the voltage detection circuit 61 and the voltage detection circuit 62. Thus, it becomes possible to perform overheat protection for the components composing the converter 2 without using the detection voltage values from the voltage detection circuit 61 and the voltage detection circuit 62, thus making it possible to provide the highly reliable power supply device 10 that can stably supply power.

In FIG. 7, occurrence of abnormality and elimination of abnormality are shown as event examples, but the present disclosure is not limited thereto. Also in a case where the temperature Tm of the component increases during operation of the converter 2 without occurrence of abnormality, the control may be switched so that the bus voltage V2 is directly connected to the power supply voltage V1, so as to protect the components composing the converter 2. In addition, even if abnormality is not eliminated, the control may be switched so that the bus voltage V2 becomes the target bus voltage V2target, when the temperature Tm of the component has become lower than the temperature $T_{rel}$ which is the first release value after elapse of a predetermined time.

Second Embodiment

Hereinafter, a power supply device according to the second embodiment of the present disclosure will be described with reference to the drawings.

In the second embodiment, the circuit configuration of the power supply device 10 is the same as that in the first embodiment, but a control method for the converter 2 is different.

Figure 10:
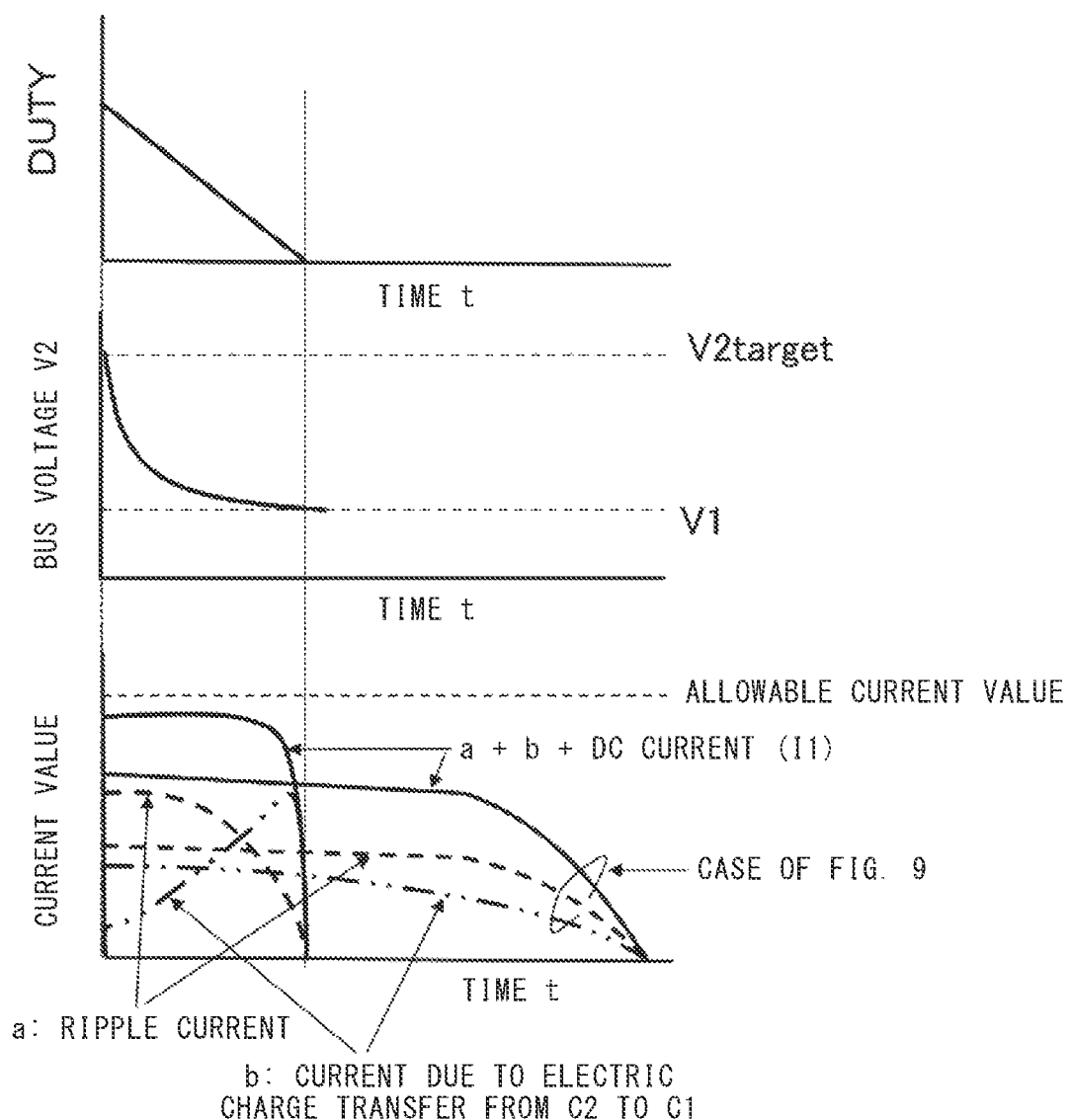
FIG. 10 shows changes in bus voltage and current ripple with respect to transition of the DUTY for the switching element Q2 of the converter according to the second embodiment of the present disclosure.

FIG. 10 illustrates a control method for the converter 2 according to the second embodiment, and shows a control method for shortening the period for shifting to the direct-connection state in which the bus voltage V2 becomes the power supply voltage V1 when the temperature Tm of the component composing the converter 2 has exceeded the temperature $T_{lim1}$ which is the first limitation value, as compared to the case shown in FIG. 8 in the first embodiment. In order to shorten the period for shifting to the direct-connection state in which the bus voltage V2 becomes the power supply voltage V1, the change rate of the DUTY for the switching element Q2 may be increased while the following condition is satisfied.

That is, DC current I1 flowing through the reactor L1, ripple current (a), and current (b) generated for transferring electric charge of the output capacitor C2 to the input capacitor C1, flow in the converter 2. Control is performed so that the sum of these currents (a+b+DC current) does not exceed the allowable current of the converter 2. The allowable current is determined so as not to break the switching elements.

In FIG. 10, a broken line indicates the ripple current, a two-dot dashed line indicates the current generated by electric charge transfer from the capacitor C2 to the capacitor C1, and a solid line indicates the sum of the currents. When the bus voltage V2 is high and the ripple current is great, the change rate of the DUTY is set to be mild, and as V2 is lowered and the ripple current is reduced, the change rate of the DUTY is set to be sharp, whereby the ratio of the current generated by electric charge transfer from the capacitor C2 to the capacitor C1 is adjusted, thus making a setting within a range in which the sum of the currents does not exceed the allowable current. In this way, it is possible to quickly reduce the temperature Tm of the converter 2 without causing breakage of the components composing the converter 2 or the like due to exceeding the allowable current.

In FIG. 10, the ripple current, the current generated by electric charge transfer from the capacitor C2 to the capacitor C1, and the sum of the currents, corresponding to the DUTY change rate in FIG. 9, are shown by thin lines. It is found that, also in the pattern shown in FIG. 9 in the first embodiment, the sum of the currents does not exceed the allowable current value, but the temperature Tm of the converter 2 is mildly reduced with a longer time.

As described above, according to the second embodiment, the effects in the first embodiment are provided. Further, the change rate of the DUTY for the switching element Q2 is increased while adjustment is performed so that the sum of the ripple current, the current generated by electric charge transfer from the capacitor C2 to the capacitor C1, and the DC current flowing through the reactor L1 does not exceed the allowable current. Thus, it is possible to quickly reduce the temperature Tm of the converter 2 without causing breakage of the converter 2 due to exceeding the allowable current.

Third Embodiment

Hereinafter, a power supply device according to the third embodiment of the present disclosure will be described with reference to the drawings.

In the third embodiment, the circuit configuration of the power supply device 10 is the same as that in the first embodiment, but a control method for the converter 2 is different.

In the first embodiment, if the temperature Tm of the component composing the converter 2 becomes smaller than the temperature $T_{rel}$ which is the first release value set to be smaller than the temperature $T_{lim1}$ which is the first limitation value in step 3105, the state in which the bus voltage V2 is directly connected to the power supply voltage V1 is released (step S106) and control is performed so that the bus voltage V2 becomes the target bus voltage V2target again.

In the third embodiment, a method for returning to the feedback control in step 3102 while adjusting the change rate of the DUTY for the switching element Q2 when the state in which the bus voltage V2 is directly connected to the power supply voltage V1 is released in step S106, will be described with reference to FIG. 11.

Figure 11:
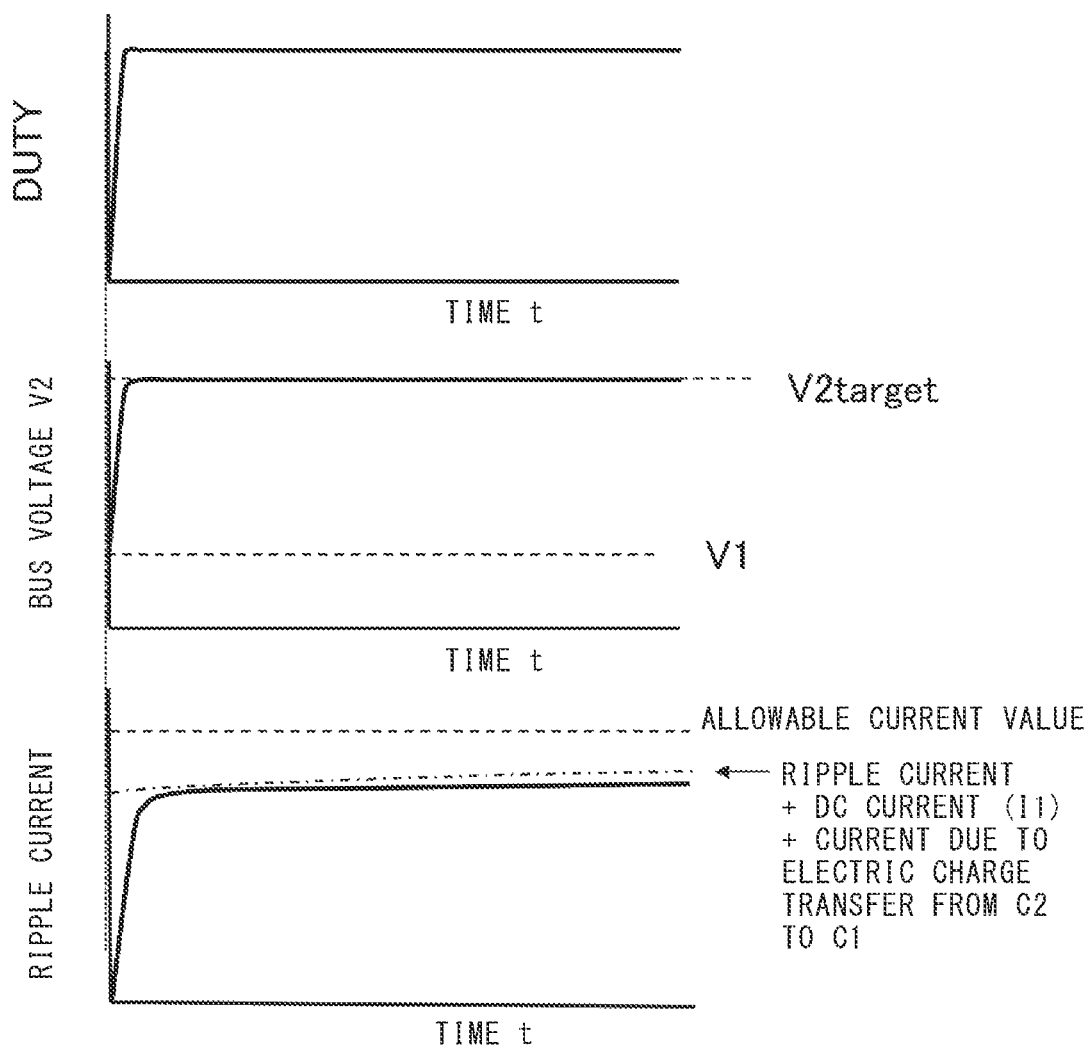
FIG. 11 shows changes in bus voltage and a current value with respect to transition of the DUTY for the switching element Q2 of the converter according to the third embodiment of the present disclosure.

FIG. 11 shows change in the bus voltage V2 and change in the ripple current with respect to change in the DUTY in returning from step S106 to step S102. In returning from step S106 to step 3102, current flowing through the converter 2 is mostly ripple current, and therefore the ripple current of the converter 2 sharply increases if the DUTY is sharply increased. Accordingly, as shown in FIG. 11, it is desirable to change the DUTY so that the change rate of the bus voltage V2 is maximized within a range in which the ripple current does not exceed the allowable current value. Thus, it is possible to quickly return to the feedback control state without breaking the components composing the converter 2 due to exceeding the allowable current.

Fourth Embodiment

Hereinafter, a power supply device according to the fourth embodiment of the present disclosure will be described with reference to the drawings.

In the fourth embodiment, the circuit configuration of the power supply device 10 is the same as that in the first embodiment, but a control method for the converter 2 is different.

In the fourth embodiment, when the state in which the bus voltage V2 is directly connected to the power supply voltage V1 is released in step S106, control is performed so as to return to the feedback control in step S102 while adjusting the change rate of the DUTY for the switching element Q2, unlike the third embodiment. Hereinafter, this method will be described with reference to FIG. 12.

Figure 12:
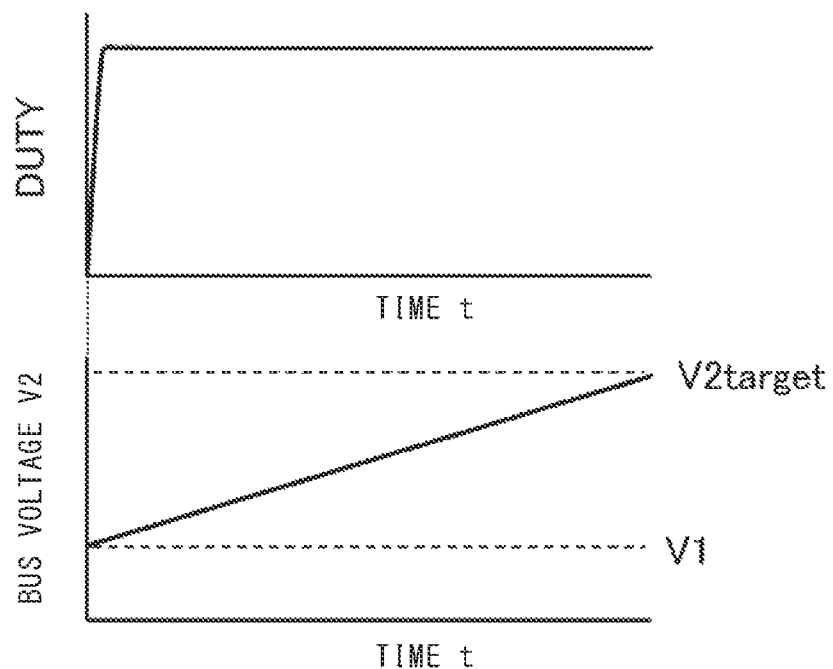
FIG. 12 shows change in bus voltage with respect to transition of the DUTY for the switching element Q2 of the converter according to the fourth embodiment of the present disclosure.

FIG. 12 shows change in the DUTY and change in the bus voltage V2 in returning from step 3106 to step 3102. In returning from step S106 to step S102, if the bus voltage V2 is sharply changed, operational shock to the inverter 3 is great. Therefore, if the change rate of the bus voltage V2 is set to be slower than response on the inverter 3 side as shown in FIG. 12, operational shock to the inverter 3 can be reduced. When the bus voltage V2 has reached a predetermined voltage value, it is possible to shift to the feedback control using the power supply voltage V1 and the bus voltage V2 respectively detected by the voltage detection circuits 61, 62.

Fifth Embodiment

Hereinafter, a power supply device according to the fifth embodiment of the present disclosure will be described with reference to the drawings.

In the fifth embodiment, the circuit configuration of the power supply device 10 is the same as that in the first embodiment, but a control method for the converter 2 is different.

The fifth embodiment is an example in which a temperature $T_{lim2}$ which is a second limitation value lower than the first limitation value (temperature $T_{lim1}$) is set for the temperature Tm of the component composing the converter 2. The temperature $T_{lim2}$ which is the second limitation value is higher than the temperature $T_{rel}$ which is the first release value.

Figure 13:
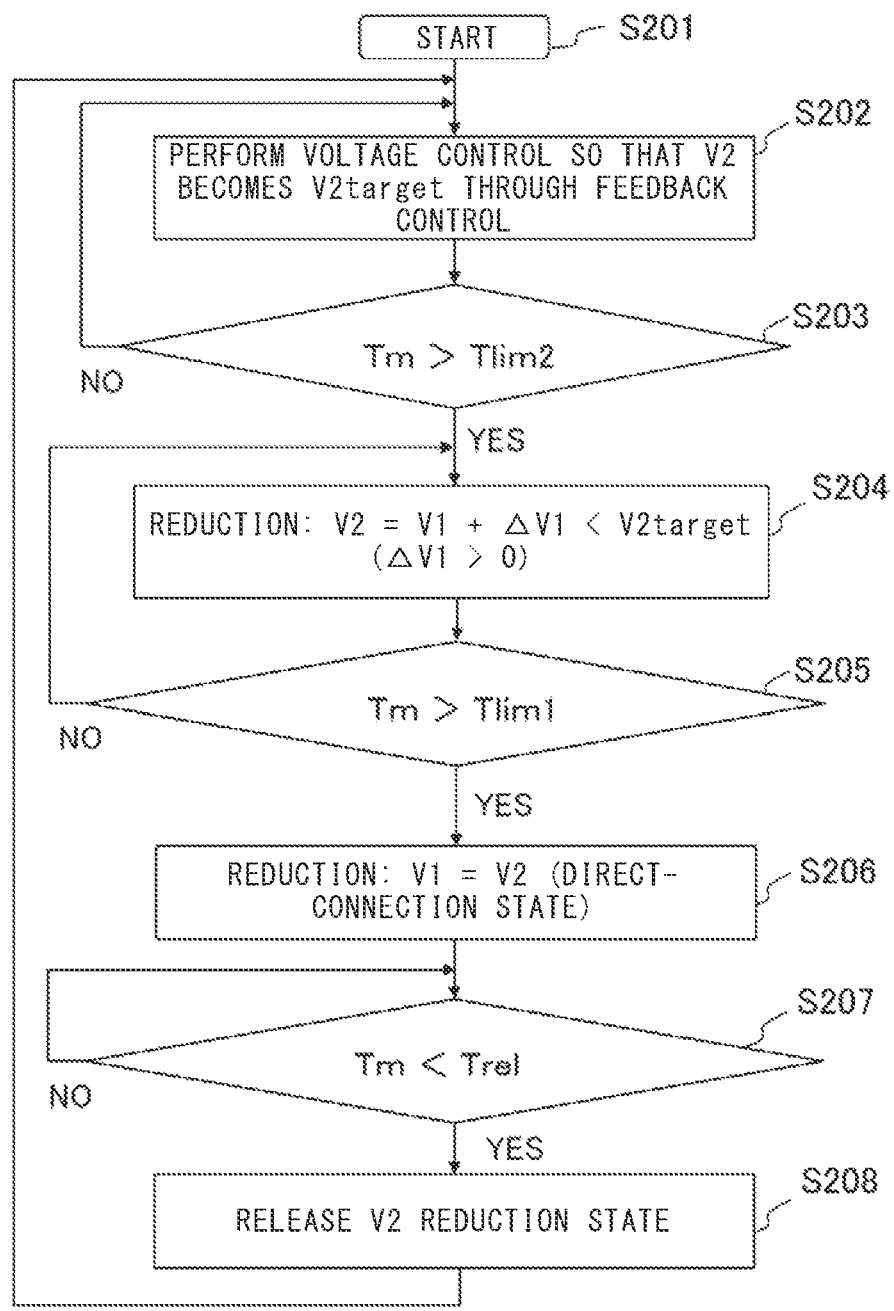
FIG. 13 is a flowchart showing a control procedure for the converter according to the fifth embodiment of the present disclosure.

Next, the temperature Tm of the component of the converter 2 detected by the temperature detection circuit 7 and operation of the converter 2 in the fifth embodiment will be described in detail. FIG. 13 is a flowchart showing an operation procedure for controlling the converter 2 in accordance with the temperature Tm of the component of the converter 2, and FIG. 14 is a time chart showing transitions of the temperature Tm of the component of the converter 2 and the bus voltage V2.

First, operation of the power supply device 10 is started (step S201). In step S202, the converter 2 is controlled by the control unit 5 so that the bus voltage V2 which is the output voltage thereof becomes the target bus voltage V2target at which losses in the converter 2, the inverter 3, and the electric motor 4 are small and which is not less than the lower limit value (V2min) of voltage determined by the torque and the rotational speed of the electric motor 4. At this time, on the basis of V1 detected by the voltage detection circuit 61 and V2 detected by the voltage detection circuit 62, the control unit 5 controls ON/OFF operations of the switching elements Q1, Q2 through feedback control, to perform voltage control for the bus voltage V2. A steady state when the converter 2 is operating at the target bus voltage V2target corresponds to a state at time t0 before time t1 in FIG. 14. Step S201 and step S202 are the same as step S101 and step S102 in FIG. 6 in the first embodiment.

Figure 14:
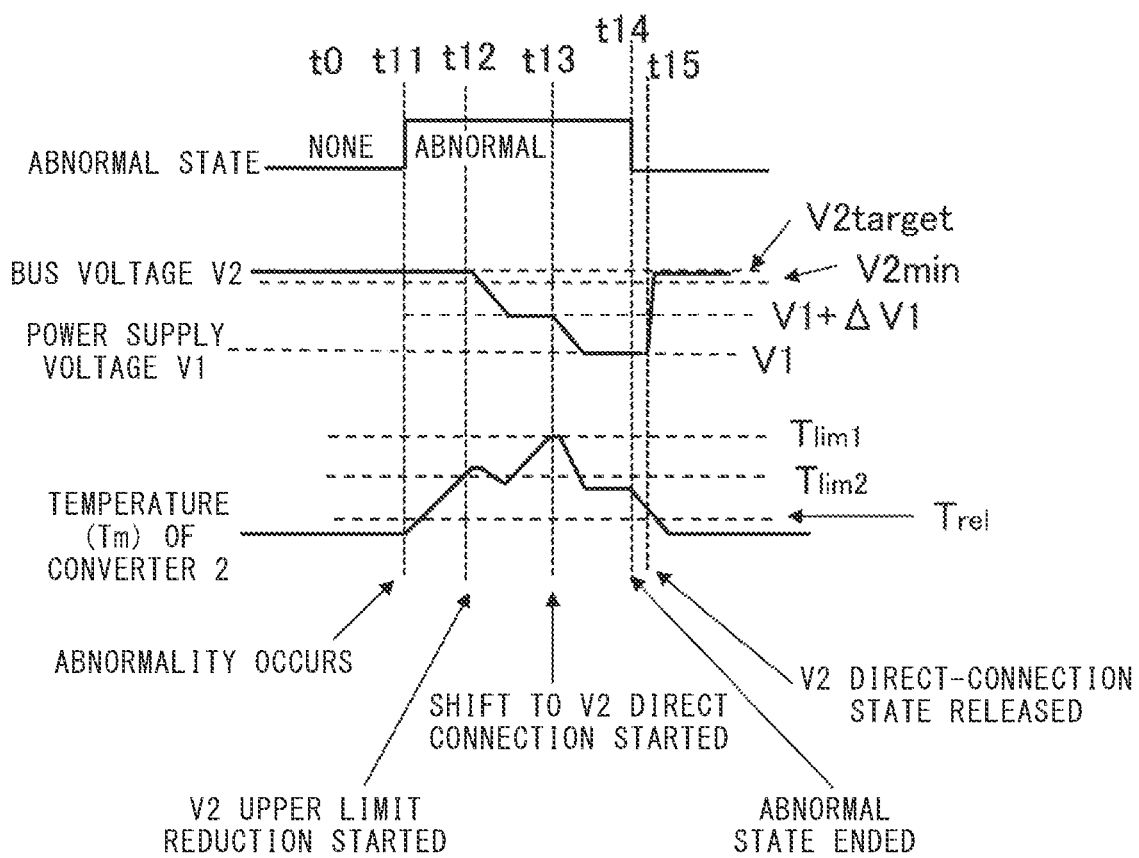
FIG. 14 shows changes in the temperature of the converter and bus voltage according to the fifth embodiment.

In FIG. 14, at time t11, if abnormality such as increase in a water temperature of a cooler for cooling the converter 2 occurs, the temperature Tm of the component composing the converter 2 detected by the temperature detection circuit 7 starts to increase. At time t12, if the temperature Tm exceeds the temperature $T_{lim2}$ which is the predetermined second limitation value (step 3203), the control unit 5 performs control so that the bus voltage V2 is reduced to be lowered from the target bus voltage V2target to the voltage V1+ΔV1 (step S204). Specifically, feedback control is stopped, and control is switched to reduce the DUTY for the switching element Q2 in ON/OFF operations of the switching elements Q1, Q2. This control for reducing the bus voltage V2 is continued within a range in which the temperature Tm does not exceed the temperature $T_{lim1}$ which is the first limitation value (NO in step S205).

When a certain period has elapsed from time t12, if the temperature Tm of the component composing the converter 2 increases again and exceeds the temperature $T_{lim1}$ which is the first limitation value (YES in step S205), as in step S104 in the first embodiment, the control unit 5 performs control so that the bus voltage V2 is reduced to be lowered from the target bus voltage V2target to the power supply voltage V1 (step 3206).

The subsequent operations from step S206 to step S208 are the same as those from step S104 to step S106 in FIG. 6 in the first embodiment, and therefore the description thereof is omitted.

As a matter of course, the control methods in the third embodiment and the fourth embodiment can be used in control when returning from step S208 to step S202.

As a matter of course, the control methods in the first embodiment and the second embodiment can be used in control when shifting from step S205 to step S206.

As described above, the power supply device according to the fifth embodiment provides the same effects as in the first to fourth embodiments. In addition, the second limitation value smaller than the first limitation value is provided. Thus, without excessively reducing the bus voltage V2, temperature increase of the components composing the converter 2 is suppressed, and meanwhile, if the temperature further increases to exceed the second limitation value, it is possible to perform operations of shifting to the direct-connection state to the power supply voltage and returning from the direct-connection state to the feedback control as in the first to fourth embodiments.

In addition, the range between the first limitation value and the second limitation value may be further divided to set another limitation value, and $\Delta V1$ in $V2=V1+\Delta V1$ representing the upper limit value for the bus voltage V2 may be set in a finely divided manner so as to correspond to the divided limitation values, whereby it becomes possible to perform reduction control for the bus voltage V2 in a stepwise manner. Thus, temperature increase is confirmed in a finely divided manner, and accordingly, the bus voltage V2 is not sharply changed, so that load on components is reduced.

The above embodiment has shown the case where the temperature Tm of the component composing the converter 2 increases again to exceed the temperature $T_{lim1}$ which is the first limitation value when a certain period has elapsed from time t12. On the other hand, if the temperature Tm of the component composing the converter 2 becomes lower than the temperature $T_{rel}$ which is the first release value when a certain period has elapsed from time t12, the control may be returned to the feedback control. That is, in a case of not exceeding the temperature $T_{lim1}$ which is the first limitation value in step S205, the process returns to step S204 in FIG. 13, but the process may return to step S203 to confirm whether or not the temperature $T_{lim2}$ which is the second limitation value is exceeded.

Sixth Embodiment

Hereinafter, a power supply device according to the sixth embodiment of the present disclosure will be described with reference to the drawings.

In the sixth embodiment, while the circuit configuration of the power supply device 10 is the same as that in the first embodiment, a control method for the converter 2 in a case where voltages cannot be detected by the voltage detection circuits 61, 62 will be described. The other control methods are the same as those in the first to fifth embodiments.

Figure 15:
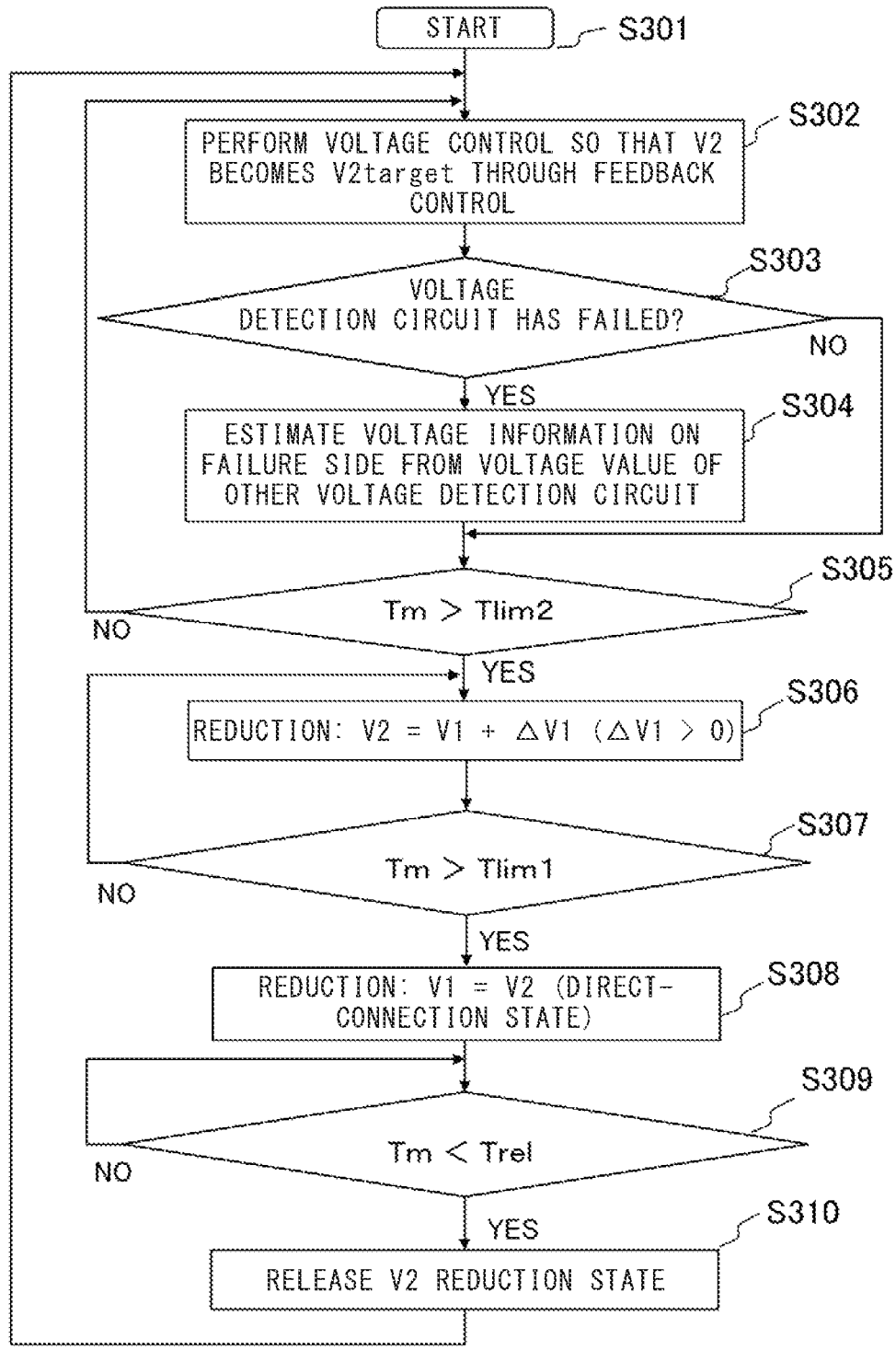
FIG. 15 is a flowchart showing a control procedure for the converter according to the sixth embodiment of the present disclosure.

Next, the temperature Tm of the component of the converter 2 detected by the temperature detection circuit 7 and operation of the converter 2 in the sixth embodiment will be described in detail. FIG. 15 is a flowchart showing an operation procedure for controlling the converter 2 in accordance with the temperature Tm of the component of the converter 2, and FIGS. 16A and 16B show current and voltage waveforms at each part in the converter 2. FIG. 16A shows a case of increasing the bus voltage V2, and FIG. 16B shows a case of making the bus voltage V2 smaller than in the case of FIG. 16A. Here, it is assumed that the bus voltage V2 cannot be detected by the voltage detection circuit 62, as an example. The case where the voltage cannot be detected is mainly a case where a voltage sensor provided in a circuit fails, but here, is referred to as failure of the voltage detection circuit, including such a case.

First, operation of the power supply device 10 is started (step S301). In step S302, the converter 2 is controlled by the control unit 5 so that the bus voltage V2 which is the output voltage thereof becomes the target bus voltage V2target at which losses in the converter 2, the inverter 3, and the electric motor 4 are small and which is not less than the lower limit value (V2min) of voltage determined by the torque and the rotational speed of the electric motor 4. At this time, on the basis of V1 detected by the voltage detection circuit 61 and V2 detected by the voltage detection circuit 62, the control unit 5 controls ON/OFF operations of the switching elements Q1, Q2 through feedback control, to perform voltage control for the bus voltage V2.

If the voltage detection circuit 62 fails (YES in step 3303), the control unit 5 estimates the bus voltage V2 using the power supply voltage V1 detected by the other voltage detection circuit 61 (step S304), and performs feedback control using the power supply voltage V1 detected by the voltage detection circuit 61 and the bus voltage V2 estimated therefrom.

Next, a method for estimating the bus voltage V2 in step S304 will be described.

On the basis of the power supply voltage V1 detected by the voltage detection circuit 61 and the DUTY cycle for the switching element Q2, the control unit 5 estimates the bus voltage V2 which is the reading value of the voltage detection circuit 62, as follows:

$$V2=V1/(1-\text{DUTY}).$$

Thus, the bus voltage V2 is replaced with the estimated value. Then, using the replaced V2 and the power supply voltage V1 detected by the voltage detection circuit 61, feedback control is performed.

The ON/OFF control for the switching elements Q1, Q2 is as shown in FIGS. 16A and 16B, and at this time, voltage change in the reactor L1, i.e., change in the bus voltage V2 is also as shown in FIG. 16.

Since the replaced value based on the power supply voltage V1 is used for the bus voltage V2 as described above, it is also assumed that increase in the temperature Tm of the component composing the converter 2 might progress due to discrepancy from the actual value of the bus voltage V2. If the temperature Tm increases to exceed the temperature $T_{lim2}$ which is the second limitation value (step S305), the control unit 5 performs control so that the bus voltage V2 is reduced to be lowered from the target bus voltage V2target to the voltage $V1+\Delta V1$ (step S306), thus suppressing temperature increase.

While the upper limit value for the bus voltage V2 is set as $V2=V1+\Delta V1$, if the temperature further increases to exceed the temperature $T_{lim1}$ which is the first limitation value (step S307), the DUTY is gradually changed so that the bus voltage is directly connected to the power supply voltage with a predetermined pattern not using the detection value of the power supply voltage V1 detected by the voltage detection circuit 61 (step S308). The DUTY change pattern at this time is the same as those described in the first and second embodiments.

Through reduction of the bus voltage V2, if the temperature Tm of the component composing the converter 2 has become lower than the temperature $T_{rel}$ which is the first release value, the voltage reduction for the bus voltage V2 is released, and the control is returned to the feedback control in a state in which the reading value V2 of the voltage detection circuit 62 is replaced as V2=V1/(1−DUTY). The DUTY change pattern in returning from the direct-connection state to the feedback control state is the same as those described in the third and fourth embodiments.

The above embodiment has shown the case where the voltage detection circuit 62 fails. However, a case where the voltage detection circuit 61 fails can also be coped with by a similar control method. For example, in a case where the voltage detection circuit 61 fails and V1 cannot be correctly read, the feedback control may be performed with V1 replaced as V1=V2×(1−DUTY) on the basis of the reading value V2 of the voltage detection circuit 62.

As described above, according to the sixth embodiment, even if one of the voltage detection circuit 61 for detecting the power supply voltage V1 and the voltage detection circuit 62 for detecting the bus voltage V2 has failed, the voltage detection value for the failed one is estimated using the other one and a value replaced therewith is used, whereby it becomes possible to perform feedback control by ON/OFF control of the switching elements Q1, Q2 provided in the converter 2.

As shown in FIG. 17 which shows an example of hardware, the control unit 5 of the power supply device is configured from a processor 100 and a storage device 200. The storage device is provided with a volatile storage device such as a random access memory, and a nonvolatile auxiliary storage device such as a flash memory, although not shown. Instead of a flash memory, an auxiliary storage device of a hard disk may be provided. The processor 100 executes a program inputted from the storage device 200. In this case, the program is inputted from the auxiliary storage device to the processor 100 via the volatile storage device. The processor 100 may output data such as a calculation result to the volatile storage device of the storage device 200, or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 power supply
2 converter
3 inverter
4 electric motor
5 control unit
61 voltage detection circuit
62 voltage detection circuit
7 temperature detection circuit
10 power supply device
C1 input capacitor
C2 output capacitor
D1 to D8 rectification element
L1 reactor
Q1 to Q8 switching element
V1 power supply voltage
V2 bus voltage

What is claimed is:

1. A power supply device comprising:
a converter connected to a power supply and having a plurality of switching elements;
a temperature detection circuit for detecting a temperature of the converter;
an inverter which is connected between the converter and a load, and which converts output voltage of the converter and outputs resultant voltage to the load; and
a controller to control the switching elements so that the output voltage of the converter becomes predetermined target output voltage, wherein
when the temperature detected by the temperature detection circuit has exceeded a predetermined first limitation value, the controller controls the switching elements so that the output voltage of the converter becomes voltage of the power supply from the target output voltage, wherein:
i): a change rate of the output voltage is a first constant change rate, or
ii): a duty cycle of the switching elements varied at a second constant change rate.

2. The power supply device according to claim 1, wherein the controller controls the switching elements such that the change rate of the output voltage is slower than response of the inverter and is the first constant change rate.

3. The power supply device according to claim 1, wherein the controller controls the switching elements such that the change rate of the output voltage is maximized within a range not exceeding allowable current of the converter.

4. The power supply device according to claim 1, wherein when the temperature detected by the temperature detection circuit has become lower than a predetermined release value lower than the first limitation value, the controller controls the switching elements such that the change rate of the output voltage is maximized within a range not exceeding allowable current of the converter, thus causing the output voltage to be the target output voltage.

5. The power supply device according to claim 1, wherein when the temperature detected by the temperature detection circuit has become lower than a predetermined release value lower than the first limitation value, the controller controls the switching elements such that the change rate of the output voltage being controlled is slower than response of the inverter and is the first constant change rate, thus causing the output voltage to be the target output voltage.

6. The power supply device according to claim 1, wherein when the temperature detected by the temperature detection circuit has exceeded a second limitation value set to be lower than the first limitation value, the controller sets the output voltage to a voltage lower than the target output voltage and higher than the voltage of the power supply, to control the switching elements.

7. The power supply device according to claim 1, further comprising:
a first voltage detection circuit for detecting the voltage of the power supply; and
a second voltage detection circuit for detecting the output voltage of the converter, wherein
in a case of performing control so that the output voltage of the converter becomes the target output voltage, the controller performs feedback control using the voltage detected by the first voltage detection circuit and the voltage detected by the second voltage detection circuit.

8. The power supply device according to claim 7, wherein
when one of the first voltage detection circuit and the second voltage detection circuit is unable to perform voltage detection, the controller estimates a voltage value of the voltage detection circuit that is unable to perform voltage detection, from a voltage value of the voltage detection circuit that is able to perform voltage detection and a ratio of an ON period and an OFF period of the switching element of the converter, to perform the feedback control.

9. A power supply device comprising:
a converter connected to a power supply and having a plurality of switching elements;
a temperature detection circuit for detecting a temperature of the converter;
an inverter which is connected between the converter and a load, and which converts output voltage of the converter and outputs resultant voltage to the load; and
a controller to control the switching elements so that the output voltage of the converter becomes predetermined target output voltage, wherein
when the temperature detected by the temperature detection circuit has exceeded a predetermined second limitation value, the controller controls the switching elements so that the output voltage of the converter becomes voltage lower than the target output voltage and higher than voltage of the power supply.

10. The power supply device according to claim 9, wherein
when the temperature detected by the temperature detection circuit has become lower than a predetermined release value lower than the second limitation value, the controller controls the switching elements such that a change rate of the output voltage is slower than response of the inverter and is a constant change rate, thus causing the output voltage to be the target output voltage.

11. The power supply device according to claim 9, wherein
when the temperature detected by the temperature detection circuit has become lower than a predetermined release value lower than the second limitation value, the controller controls the switching elements such that a change rate of the output voltage is maximized within a range not exceeding allowable current of the converter, thus causing the output voltage to be the target output voltage.

12. The power supply device according to claim 9, further comprising:
a first voltage detection circuit for detecting the voltage of the power supply; and
a second voltage detection circuit for detecting the output voltage of the converter, wherein
in a case of performing control so that the output voltage of the converter becomes the target output voltage, the controller performs feedback control using the voltage detected by the first voltage detection circuit and the voltage detected by the second voltage detection circuit.

13. The power supply device according to claim 12, wherein
when one of the first voltage detection circuit and the second voltage detection circuit is unable to perform voltage detection, the controller estimates a voltage value of the voltage detection circuit that is unable to perform voltage detection, from a voltage value of the voltage detection circuit that is able to perform voltage detection and a ratio of an ON period and an OFF period of the switching element of the converter, to perform the feedback control.

\* \* \* \* \*